United States Patent
Gauthier

(10) Patent No.: US 8,989,701 B2
(45) Date of Patent: Mar. 24, 2015

(54) IDENTIFYING A WIRELESS DEVICE OF A TARGET USER FOR COMMUNICATION INTERCEPTION BASED ON INDIVIDUAL USAGE PATTERN(S)

(75) Inventor: Claude Gauthier, Richelieu (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 176 days.

(21) Appl. No.: 13/468,263

(22) Filed: May 10, 2012

(65) Prior Publication Data

US 2013/0303110 A1 Nov. 14, 2013

(51) Int. Cl.
*H04M 11/00* (2006.01)

(52) U.S. Cl.
USPC ........ 455/406; 455/410; 455/411; 455/414.1; 455/414.2

(58) Field of Classification Search
USPC ............ 455/405, 406, 410, 411, 414.1, 414.2
See application file for complete search history.

(56) References Cited

U.S. PATENT DOCUMENTS

| | | | |
|---|---|---|---|
| 6,738,902 B1 | 5/2004 | Ruppert et al. | |
| 7,089,592 B2 | 8/2006 | Adjaoute | |
| 7,532,895 B2* | 5/2009 | Hrastar | 455/456.1 |
| 7,551,922 B2* | 6/2009 | Roskowski et al. | 455/423 |
| 2008/0162397 A1* | 7/2008 | Zaltzman | 706/48 |
| 2009/0012826 A1 | 1/2009 | Eilam et al. | |
| 2010/0330954 A1* | 12/2010 | Manning Cassett et al. | 455/405 |
| 2011/0003586 A1* | 1/2011 | Harrigan | 455/419 |
| 2011/0202980 A1 | 8/2011 | Imbimbo et al. | |
| 2012/0072453 A1* | 3/2012 | Guerra et al. | 707/776 |

FOREIGN PATENT DOCUMENTS

| | | |
|---|---|---|
| CA | 2500082 A1 | 9/2006 |
| EP | 2169992 A1 | 3/2010 |

OTHER PUBLICATIONS

European Search Report for European Patent Application No. 13002458.1, mailed Sep. 16, 2013, 7 pages.

* cited by examiner

*Primary Examiner* — Khalid Shaheed
(74) *Attorney, Agent, or Firm* — Withrow & Terranova, PLLC

(57) ABSTRACT

Systems and methods for intercepting communications in a cellular communication network are disclosed. In one embodiment, one or more individual usage patterns are detected for a target user based on usage data collected from a known wireless device of the target user. The one or more individual usage patterns for the target user are compared to usage data collected from other wireless devices to identify another wireless device that has usage data that matches the one or more individual usage patterns for the target user to at least a predefined threshold degree. In response, one or more predefined actions are taken with respect to the matching wireless device. In one embodiment, an authorized authority is notified of the matching wireless device and/or communications to and/or from the matching wireless device are automatically intercepted and delivered to the authorized authority.

34 Claims, 2 Drawing Sheets

Figure 1:
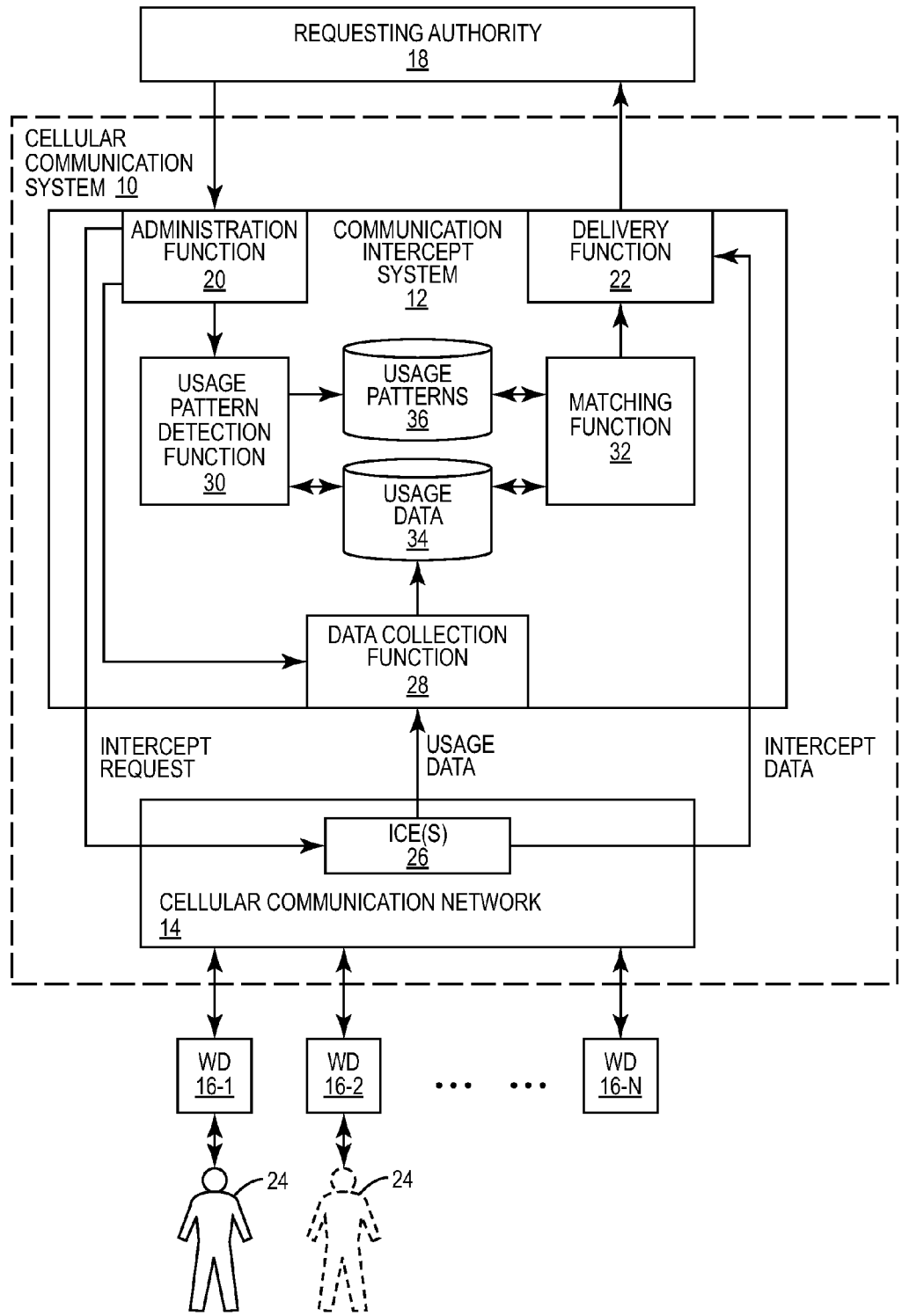

IDENTIFYING A WIRELESS DEVICE OF A TARGET USER FOR COMMUNICATION INTERCEPTION BASED ON INDIVIDUAL USAGE PATTERN(S)

FIELD OF THE DISCLOSURE

The present disclosure relates to intercepting communications in a cellular communication network.

BACKGROUND

Authorized authorities (e.g., law enforcement agencies) often intercept communications, such as calls, made in cellular communication networks in order to monitor the content of communications to and from target users such as members of gang organizations, members of the mafia, drug dealers, etc. As such, cellular communication networks are required to have the appropriate infrastructure to permit interception of communications to and from target users. However, these target users often use multiple wireless devices (e.g., multiple mobile phones) and frequently change wireless devices in order to thwart the authorized authorities from intercepting their communications. Further, these wireless devices are often registered in the names of different individuals. As an example, a target user may switch mobile phones every four or five weeks, where each mobile phone may be registered in the name of a different individual. When the target user switches to a new mobile phone, the authorized authorities are no longer able to intercept calls to and from the target user on the new mobile phone. Thus, there is a need for a system and method for intercepting communications to and from a target user even if the target user uses multiple mobile phones and/or switches to different mobile phones.

SUMMARY

Systems and methods for intercepting communications in a cellular communication network are disclosed. In one embodiment, one or more individual usage patterns are detected for a target user based on usage data collected from a known wireless device of the target user. The usage data collected from the known wireless device of the target user includes, but is not limited to, location information that defines a location of the known wireless device of the target user, accelerometer information from an accelerometer of the known wireless device of the target user, gyroscope information from a gyroscope of the known wireless device of the target user, electronic compass information from an electronic compass of the known wireless device of the target user, application usage information for one or more applications executed on the known wireless device of the target user, game usage information for one or more games executed on the known wireless device of the target user, web browsing information for one or more web browsers executed on the known wireless device of the target user, calling patterns on the known wireless device of the target user, texting patterns on the known wireless device of the target user, or any combination thereof. The one or more individual usage patterns for the target user are compared to usage data collected from other wireless devices to identify another wireless device that has usage data that matches the one or more individual usage patterns for the target user to at least a predefined threshold degree. In response, one or more predefined actions are taken with respect to the matching wireless device. In one embodiment, an authorized authority is notified of the matching wireless device and/or communications to and/or from the matching wireless device are automatically intercepted and delivered to the authorized authority.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2:
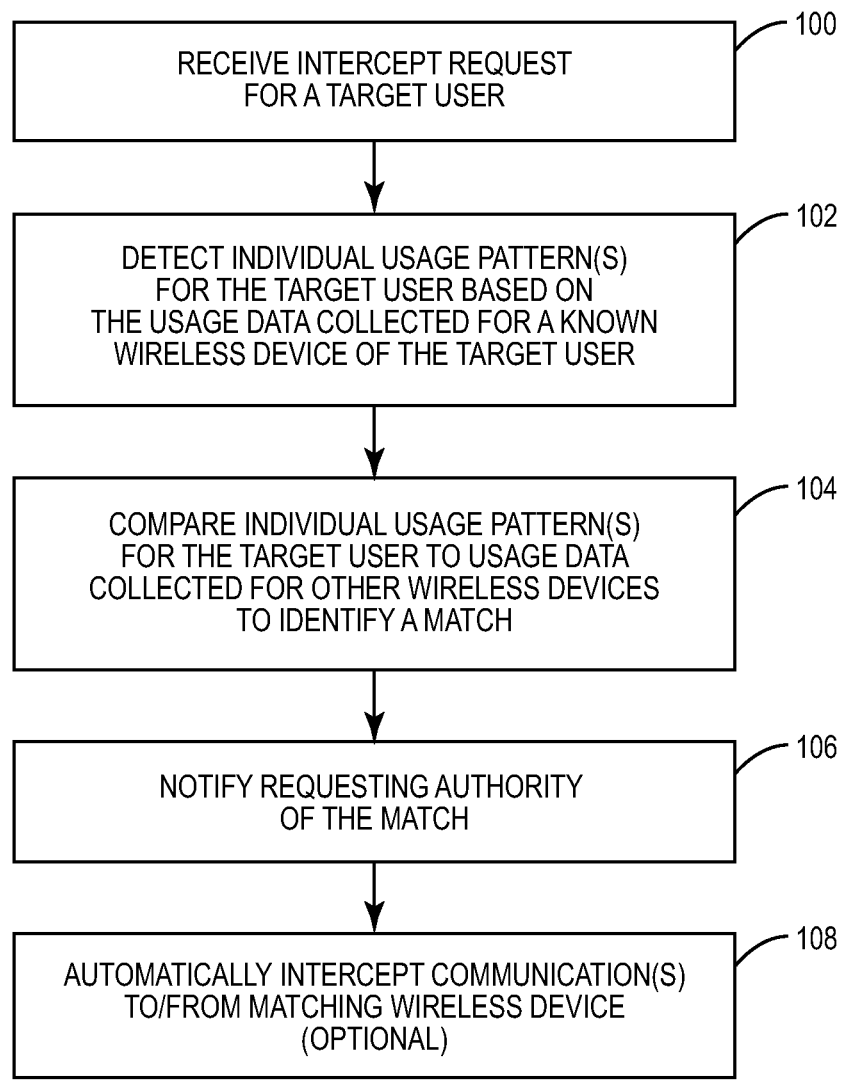

FIG. 1 illustrates a system for intercepting communications to and from a target user in a cellular communication network according to one embodiment of the present disclosure; and FIG. 2 is a flow chart that illustrates a process for identifying a new or additional wireless device or a potential new or additional wireless device of a target user based on one or more individual usage patterns for the target user detected based on usage data collected from a known wireless device of the target user according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a cellular communication system 10 that includes a communication intercept system 12 that utilizes individual usage patterns to identify wireless devices that are being used by target users according to one embodiment of the present disclosure. As used herein, a "target user" is a user for which communications are to be intercepted by the communication intercept system 12. As illustrated, the cellular communication system 10 includes the communication intercept system 12 and a cellular communication network 14. The cellular communication network 14 generally operates to provide cellular communication service to a number of wireless devices 16-1 through 16-N. The wireless devices 16-1 through 16-N are generally referred to herein collectively as wireless devices 16 and individually as wireless device 16. The cellular communication network 14 is any type of cellular communication network such as, for example, a 3G or 4G cellular communication network. Each of the wireless devices 16 is any type of wireless device served by the cellular communication network 14 such as, for example, a mobile phone, a tablet computer equipped with a cellular network interface, or the like.

The communication intercept system 12 operates to intercept communications to and from target users at the request of a requesting authority 18. The requesting authority 18 may be, for example, a law enforcement agency, but is not limited thereto. More generally, the requesting authority 18 is any individual or entity having legal authority to intercept communications to and from one or more particular users, which are referred to herein as target users. In this particular embodiment, the communication intercept system 12 includes an administration function 20 and a delivery function 22. The administration function 20 operates to receive an intercept request from the requesting authority 18 that identifies a target user 24 for which interception is desired. The intercept request includes information that identifies a known wireless device of the target user 24, which in this example is the wireless device 16-1. In some embodiments, the administration function 20 also verifies that the requesting authority 18 is legally authorized to intercept communications to and from the target user 24 by, for example, requiring that the requesting authority 18 provide a valid warrant to intercept communications to and from the target user 24.

Upon receiving and, in some embodiments, verifying the intercept request, the administration function 20 sends an intercept request to one or more Intercept Control Elements (ICEs) 26 in the cellular communication network 14. The intercept request includes information that identifies the known wireless device of the target user 24, which again in this example is the wireless device 16-1. The ICEs 26 are generally network nodes in the cellular communication network 14 that enable interception of communications to and from target users such as the target user 24. For example, for a 3G cellular communication network, the ICEs 26 may be 3G Mobile Service Mobile Switching Center (MSC) servers, 3G Gateway MSC servers, Serving General Packet Radio Service (GPRS) Support Nodes (SGSNs), or Gateway GSNs (GGSNs). As another example, for a 4G cellular communication network and in particular a Long Term Evolution (LTE) or LTE-Advanced cellular communication network, the ICEs 26 may be eNodeB, Mobility Management Entity (MME), Serving Gateway (S-GW), Packet Data Network Gateway (P-GW), or Home Subscriber Server (HSS).

In response to the intercept request from the administration function 20 of the communication intercept system 12, the ICEs 26 intercept communications to and from the wireless device 16-1 of the target user 24 and return corresponding intercept data to the delivery function 22 of the communication intercept system 12. The delivery function 22 then returns the intercept data to the requesting authority 18. The intercept data may include, for example, the content of a call to or from the wireless device 16-1 of the target user 24.

In order to detect other wireless devices 16 used by the target user 24, the communication intercept system 12 also includes a data collection function 28, a usage pattern detection function 30, and a matching function 32. The data collection function 28 operates to collect usage data from the wireless devices 16-1 through 16-N and store the usage data in a usage data repository 34. Notably, the wireless devices 16-1 through 16-N may be all wireless devices served by the cellular communication network 14 or a subset of all wireless devices served by the cellular communication network 14. In this example, the data collection function 28 collects the usage data via the ICEs 26, but is not limited thereto. For each wireless device 16, the data collection function 28 collects one or more of the following: location information that defines a geographic location of the wireless device 16 (e.g., Global Positioning System (GPS) data including latitude and longitude data), gyroscope output data from a gyroscope of the wireless device 16, accelerometer output data from an accelerometer of the wireless device 16, electronic compass output data from an electronic compass of the wireless device 16, application usage information regarding use of applications executed on the wireless device 16 by the corresponding user, game usage information regarding use of games executed on the wireless device 16 by the corresponding user, web browsing information regarding web browsing activities of the corresponding user, a call log for calls made and/or received by the wireless device 16, a text messaging log for texts sent and/or received by the wireless device 16, or any combination thereof.

More specifically, the location information includes information that defines geographic locations at which the wireless device 16 has been located and preferably corresponding timestamps that define dates and/or times of day that the wireless device 16 was located at those geographic locations. The geographic locations of the wireless device 16 may be expressed using any two-dimensional or three-dimensional representation such as, for example, latitude, longitude, and potentially altitude obtained from a GPS receiver of the wireless device 16, street address, point of interest (e.g., Walmart Store #12345). The gyroscope output data preferably includes readings output from a gyroscope of the wireless device 16 that define an orientation of the wireless device 16 and, preferably, corresponding timestamps for those readings. The accelerometer output data preferably includes readings output from an accelerometer of the wireless device 16 and corresponding timestamps for those readings. The electronic compass output data preferably includes readings output from an electronic compass that define a direction in which the wireless device 16 is pointing.

The application usage data generally defines applications used by a user of the wireless device 16 and preferably timing information that defines dates and/or times of day that those applications were used by the user. For example, the application usage data may include data that indicates that the user used an email application executing on the wireless device 16 from 7:30am to 8:00am on Wednesday Apr. 11, 2012. In a similar manner, the application usage data may include similar data for other uses of the email application and/or other applications executing on the wireless device 16. In a similar manner, the game usage data generally defines games played by the user on the wireless device 16 and preferably corresponding timing information that defines dates and/or times at which the user played those games. The web browsing information generally includes information that defines web browsing activities of the user of the wireless device 16 and preferably timing information for those web browsing activities. The web browsing activities may include, for example, visiting a website, logging into a web-based service (e.g., a social networking website, a banking website, or the like), or logging out of a web-based service.

The call log generally includes information that identifies calls made and/or received by the wireless device 16. In one embodiment, the call log includes a list of phone numbers called by the wireless device 16 and, potentially, corresponding timestamps for the calls. Lastly, the texting log generally includes information that identifies other devices to which texts were sent by the wireless device 16 or from which texts were received by the wireless device 16. In one embodiment, the texting log includes a list of phone numbers to which texts were sent and/or from which texts were received and corresponding timestamps that indicate dates and times at which those texts were sent/received.

The usage pattern detection function 30 generally operates to detect usage patterns for target users, such as the target user 24, based on the usage data collected for known wireless devices of the target users and store those individual usage patterns for the target user 24 in a usage patterns repository 36. In one embodiment, in response to receiving an intercept request from the requesting authority 18 and, depending on the particular embodiment, verifying the intercept request, the administration function 20 notifies the usage pattern detection function 30 of a target user and a known wireless device of the target user subject to the intercept request. Using the target user 24 as an example, the usage pattern detection function 30 then processes the usage data collected from the wireless device 16-1 (i.e., the known wireless device of the target user 24) to detect one or more individual usage patterns for the target user 24 using any suitable pattern detection algorithm. The usage pattern detection function 30 may process usage data collected from the wireless device 16-1 collected prior to and/or after the intercept request to detect the one or more individual usage patterns for the target user 24. Further, the amount of usage data processed may vary. For instance, the amount of usage data may be all usage data collected from the wireless device 16-1 or only usage data collected from the wireless device 16-1 over several days, weeks, months, or longer prior to and/or after receiving the receiving the intercept request for the target user 24.

In general, the individual usage patterns detected for the target user 24 may be any type of usage pattern that can be detected based on the usage data collected from the wireless device 16-1. For example, the usage pattern detection function 30 may detect a location-based usage pattern that is a pattern of geographic locations visited by the target user 24 and, in some embodiments, times of the day and/or day(s) of the week that the target user 24 visits those geographic locations. As another example, the usage pattern detection function 30 may detect a gyroscope-based usage pattern that is a pattern of movement of the wireless device 16-1 and, in some embodiments, times of the day and/or day(s) of the week that the target user 24 makes those movements. In addition or alternatively, the gyroscope-based usage pattern may include information that identifies triggering events for the movements in the pattern (e.g., the target user 24 typically moves the wireless device 16-1 in a particular manner in response to receiving a call and typically moves the wireless device 16-1 in a different manner in response to receiving a text message). In a similar manner, an accelerometer-based usage pattern or an electronic compass based usage pattern may be detected.

As yet another example, the usage pattern detection function 30 may detect a pattern of usage for one or more applications executing on the wireless device 16-1. This pattern of usage of the application(s) may indicate, for example, time(s) of the day, day(s) of the week, and/or geographic location(s) at which the target user 24 uses the application(s). In a similar manner, the usage pattern detection function 30 may detect a game usage pattern for one or more games on the wireless device 16-1. The game usage pattern may indicate time(s) of the day, day(s) of the week, and/or geographic location(s) at which the target user 24 plays one or more games.

As a yet another example, the usage pattern detection function 30 may detect a pattern of usage of a web browser of the wireless device 16-1. The pattern of usage of the web browser may indicate time(s) of the day, day(s) of the week, and/or geographic location(s) at which the target user 24 uses the web browser and/or visits particular website(s). The pattern of usage of the web browser may additionally or alternatively indicate patterns for other web-based activities such as logging into particular websites, logging off particular websites, posting on particular blogs, or the like.

As a final example, the usage pattern detection function 30 may detect a pattern of phone calls and/or text messages for the wireless device 16-1. The pattern of phone calls and/or text messages may, for example, identify phone numbers called/texted from the wireless device 16-1 and, potentially, time(s) of the day, day(s) of the week, and/or geographical location(s) at which the target user 24 calls and/or texts those phone numbers. Similarly, the pattern of phone calls and/or text messages may, for example, identify phone numbers that call and/or text the target user 24 and, potentially, time(s) of the day, day(s) of the week, and/or geographical location(s) at which the target user 24 receives calls and/or texts from those phone numbers.

The matching function 32 generally operates to compare the usage data collected by the data collection function 28 and stored in the usage data repository 34 to the individual usage patterns of the target users stored in the usage patterns repository 36. When the usage data collected from one of the wireless devices 16 matches the one or more individual usage patterns of a target user, then that wireless device is identified as a wireless device, or potential wireless device, of the target user. Using the target user 24 as an example, assume that the target user 24 switches to wireless device 16-2 as illustrated in FIG. 1. After a sufficient amount of usage data is collected from the wireless device 16-2, the matching function 32 will detect that the usage data collected from the wireless device 16-2 matches the one or more usage patterns of the target user 24 stored in the usage patterns repository 36. The wireless device 16-2 is then identified as a wireless device or a potential wireless device of the target user 24. In this particular embodiment, the matching function 32 sends an indication of the match to the delivery function 22, which in turn notifies the requesting authority 18 that the wireless device 16-2 has been identified as a wireless device or a potential wireless device of the target user 24. In addition or alternatively, the communication intercept system 12 may then automatically begin interception of communications to and from the target user 24 on the wireless device 16-2.

FIG. 2 is a flow chart that illustrates the operation of the communication intercept system 12 of FIG. 1 to identify a new or additional wireless device or a potential new or additional wireless device of the target user 24 according to one embodiment of the present disclosure. First, the communication intercept system 12, and specifically the administration function 20, receives an intercept request from the requesting authority 18 to intercept communications to and from the target user 24 (step 100). In response, the usage pattern detection function 30 then detects one or more individual usage patterns for the target user 24 based on usage data collected from a known wireless device of the target user 24, which for this discussion is the wireless device 16-1 (step 102). The one or more individual usage patterns for the target user 24 are stored in the usage patterns repository 36. The matching function 32 compares the one or more individual usage patterns for the target user 24 to usage data collected from the other wireless devices 16 (i.e., the wireless devices 16 other than the known wireless device 16-1 of the target user 24) to identify one of the other wireless devices 16 having usage data that matches the one or more individual usage patterns of the target user 24 to at least a predefined threshold degree (step 104). The predetermined threshold degree may be defined in any suitable manner. For example, the predefined threshold degree may specified as a percentage (e.g., 25%, 50%, or 75%) such that the individual usage patterns of the target user 24 and the usage data of the other wireless device must match to at least that percentage before a match is identified.

In this example, the wireless device 16-2 is identified as having usage data that matches the one or more individual usage patterns of the target user 24 to at least the predefined threshold degree. In response, the communication intercept system 12 notifies the requesting authority 18 of the match (step 106). In one embodiment, the communication intercept system 12 notifies the requesting authority 18 of the wireless device 16-2 and the degree of match between the one or more individual usage patterns of the target user 24 and the usage data of the wireless device 16-2. In another embodiment, the communication intercept system 12 notifies the requesting authority 18 that the wireless device 16-2 has been identified as a potential new or additional wireless device of the target user 24 if the match is greater than a first predefined threshold degree and less than a second predefined threshold degree that is greater than the first predefined threshold degree and notifies the requesting authority 18 that the wireless device 16-2 is a new or additional wireless device of the target user 24 if the match is greater than the second predefined threshold degree.

Optionally, the communication intercept system 12 automatically begins interception of communications to and from the target user 24 at the wireless device 16-2 having usage data that sufficiently matches the one or more individual usage patterns of the target user 24 (step 108). In one embodiment, the communication intercept system 12 automatically begins interception of communication to and from the target user 24 at the wireless device 16-2 in response to identifying the match in step 104. However, in another embodiment, a second higher threshold degree of match may be required before automatically beginning interception of communications to and from the target user 24 at the wireless device 16-2. In an alternative embodiment, the communication intercept system 12 begins interception of communications to and from the target user 24 at the wireless device 16-2 only after sending the notification in step 106 and then receiving an intercept request from the requesting authority 18 for the target user 24 at the wireless device 16-2.

The communication intercept system 12 described herein is implemented in hardware or more preferably a combination of hardware and software. For example, the communication intercept system 12 may be implemented as a server computer that executes appropriate software. Such software is stored on a non-transitory computer-readable. Further, the communication intercept system 12 may be implemented on a single hardware node (e.g., a sing le server computer) or be distributed among multiple hardware nodes (e.g., distributed over multiple server computers).

The following acronyms are used throughout this disclosure.

GGSN Gateway General Packet Radio Service Support Node
GPRS General Packet Radio Service
GPS Global Positioning System
HSS Home Subscriber Server
ICE Intercept Control Element
LTE Long Term Evolution
MME Mobility Management Entity
MSC Mobile Switching Center
P-GW Packet Data Network Gateway
SGSN Serving General Packet Radio Service Support Node
S-GW Serving Gateway Those skilled in the art will recognize improvements and modifications to the preferred embodiments of the present disclosure. All such improvements and modifications are considered within the scope of the concepts disclosed herein and the claims that follow.

What is claimed is:

1. A method of operation of a communication intercept system associated with a cellular communication network, comprising:
    detecting, by the communication intercept system, one or more individual usage patterns for a target user based on usage data collected from a known wireless device of the target user served by the cellular communication network;
    comparing, by the communication intercept system, the one or more individual usage patterns for the target user to usage data collected from a plurality of other wireless devices served by the cellular communication network to identify a wireless device from the plurality of other wireless devices that has usage data that matches the one or more individual usage patterns of the target user to at least a predefined threshold degree; and
    taking one or more predefined actions, by the communication intercept system, with respect to the wireless device that has usage data that matches the one or more individual usage patterns of the target user to at least the predefined threshold degree;
    wherein the plurality of other wireless devices is a subset of all other wireless devices served by the cellular communication network, and an authorized authority has legal authority to intercept communications of the target user.

2. The method of claim 1 wherein at least one of the one or more individual usage patterns of the target user is based on location information collected from the known wireless device of the target user.

3. The method of claim 2 wherein the location information comprises latitude and longitude data.

4. The method of claim 1 wherein at least one of the one or more individual usage patterns of the target user is based on gyroscope information collected from the known wireless device of the target user.

5. The method of claim 1 wherein at least one of the one or more individual usage patterns of the target user is based on electronic compass information collected from the known wireless device of the target user.

6. The method of claim 1 wherein at least one of the one or more individual usage patterns of the target user is based on accelerometer information collected from the known wireless device of the target user.

7. The method of claim 1 wherein at least one of the one or more individual usage patterns of the target user is based on application usage information collected from the known wireless device of the target user.

8. The method of claim 1 wherein at least one of the one or more individual usage patterns of the target user is based on game usage information collected from the known wireless device of the target user.

9. The method of claim 1 wherein at least one of the one or more individual usage patterns of the target user is based on web browsing information collected from the known wireless device of the target user.

10. The method of claim 1 wherein at least one of the one or more individual usage patterns of the target user is based on a call log for the known wireless device of the target user.

11. The method of claim 1 wherein at least one of the one or more individual usage patterns of the target user is based on a text messaging log for the known wireless device of the target user.

12. The method of claim 1 wherein at least one of the one or more individual usage patterns of the target user is based on a combination of at least two of a group consisting of: location information collected from the known wireless device of the target user, gyroscope information collected from the known wireless device of the target user, electronic compass information collected from the known wireless device of the target user, accelerometer information collected from the known wireless device of the target user, application usage information collected from the known wireless device of the target user, game usage information collected from the known wireless device of the target user, web browsing information collected from the known wireless device of the target user, a call log for the known wireless device of the target user, and a text messaging log for the known wireless device of the target user.

13. The method of claim 1 wherein taking the one or more predefined actions comprises notifying the authorized authority of the wireless device that has usage data that matches the one or more individual usage patterns of the target user to at least the predefined threshold degree.

14. The method of claim 1 wherein taking the one or more predefined actions comprises automatically intercepting at least one of a group consisting of: communications from the wireless device that has usage data that matches the one or more individual usage patterns of the target user to at least the predefined threshold degree as communications from the target user and communications to the wireless device that has usage data that matches the one or more individual usage patterns of the target user to at least the predefined threshold degree as communications to the target user.

15. The method of claim 1 wherein taking the one or more predefined actions comprises:
notifying the authorized authority of the wireless device that has usage data that matches the one or more individual usage patterns of the target user to at least the predefined threshold degree; and
automatically intercepting at least one of a group consisting of: communications from the wireless device that has usage data that matches the one or more individual usage patterns of the target user to at least the predefined threshold degree as communications from the target user and communications to the wireless device that has usage data that matches the one or more individual usage patterns of the target user to at least the predefined threshold degree as communications to the target user.

16. The method of claim 1 wherein taking the one or more predefined actions comprises:
notifying the authorized authority of the wireless device that has usage data that matches the one or more individual usage patterns of the target user to at least the predefined threshold degree; and
if the usage data of the wireless device matches the one or more individual usage patterns of the target user to at least a second predefined threshold degree that is greater than the predefined threshold degree, automatically intercepting at least one of a group consisting of: communications from the wireless device that has usage data that matches the one or more individual usage patterns of the target user to at least the predefined threshold degree as communications from the target user and communications to the wireless device that has usage data that matches the one or more individual usage patterns of the target user to at least the predefined threshold degree as communications to the target user.

17. The method of claim 1 further comprising:
collecting the usage data from the known wireless device of the target user; and
collecting the usage data from the plurality of other wireless devices.

18. The method of claim 1 wherein the plurality of other wireless devices is all other wireless devices served by the cellular communication network.

19. A communication intercept system associated with a cellular communication network, comprising:
one or more first communication interferences configured to enable communication between the communication intercept system and an authorized authority;
one or more second communication interfaces configured to enable the communication between the communication intercept system and the cellular communication network; and
a processing sub-system associated with the one or more first communication interfaces and the one or more second communication interfaces that is configured to:
receive a communication intercept request for a target user from the authorized authority via the one or more first communication interfaces;
collect, via the one or more second communication interfaces, usage data from a known wireless device of the target user served by the cellular communication network;
detect one or more individual usage patterns for the target user based on the usage data collected from the known wireless device of the target user;
collect, via the one or more second communication interfaces, usage data from a plurality of other wireless devices served by the cellular communication network;
compare the one or more individual usage patterns for the target user to the usage data collected from the plurality of other wireless devices to identify a wireless device from the plurality of other wireless devices that has usage data that matches the one or more individual usage patterns of the target user to at least a predefined threshold degree; and
take one or more predefined actions with respect to the wireless device that has usage data that matches the one or more individual usage patterns of the target user to at least the predefined threshold degree.

20. The communication intercept system of claim 19 wherein at least one of the one or more individual usage patterns of the target user is based on location information collected from the known wireless device of the target user.

21. The communication intercept system of claim 20 wherein the location information comprises latitude and longitude data.

22. The communication intercept system of claim 19 wherein at least one of the one or more individual usage patterns of the target user is based on gyroscope information collected from the known wireless device of the target user.

23. The communication intercept system of claim 19 wherein at least one of the one or more individual usage patterns of the target user is based on accelerometer information collected from the known wireless device of the target user.

24. The communication intercept system of claim 19 wherein at least one of the one or more individual usage patterns of the target user is based on electronic compass information collected from the known wireless device of the target user.

25. The communication intercept system of claim 19 wherein at least one of the one or more individual usage patterns of the target user is based on application usage information collected from the known wireless device of the target user.

26. The communication intercept system of claim 19 wherein at least one of the one or more individual usage patterns of the target user is based on game usage information collected from the known wireless device of the target user.

27. The communication intercept system of claim 19 wherein at least one of the one or more individual usage patterns of the target user is based on web browsing information collected from the known wireless device of the target user.

28. The communication intercept system of claim 19 wherein at least one of the one or more individual usage patterns of the target user is based on a call log for the known wireless device of the target user.

29. The communication intercept system of claim 19 wherein at least one of the one or more individual usage patterns of the target user is based on a text messaging log for the known wireless device of the target user.

30. The communication intercept system of claim 19 wherein at least one of the one or more individual usage patterns of the target user is based on a combination of at least two of a group consisting of: location information collected from the known wireless device of the target user, gyroscope information collected from the known wireless device of the target user, electronic compass information collected from the known wireless device of the target user, accelerometer information collected from the known wireless device of the target user, application usage information collected from the known wireless device of the target user, game usage information collected from the known wireless device of the target user, web browsing information collected from the known wireless device of the target user, a call log for the known wireless device of the target user, and a text messaging log for the known wireless device of the target user.

31. The communication intercept system of claim 19 wherein the one or more predefined actions comprise notifying the authorized authority of the wireless device that has usage data that matches the one or more individual usage patterns of the target user to at least the predefined threshold degree.

32. The communication intercept system of claim 19 wherein the one or more predefined actions comprise automatically intercepting at least one of a group consisting of:
communications from the wireless device that has usage data that matches the one or more individual usage patterns of the target user to at least the predefined threshold degree as communications from the target user and communications to the wireless device that has usage data that matches the one or more individual usage patterns of the target user to at least the predefined threshold degree as communications to the target user.

33. The communication intercept system of claim 19 wherein the one or more predefined actions comprise:
notifying the authorized authority of the wireless device that has usage data that matches the one or more individual usage patterns of the target user to at least the predefined threshold degree; and
automatically intercepting at least one of a group consisting of: communications from the wireless device that has usage data that matches the one or more individual usage patterns of the target user to at least the predefined threshold degree as communications from the target user and communications to the wireless device that has usage data that matches the one or more individual usage patterns of the target user to at least the predefined threshold degree as communications to the target user.

34. The communication intercept system of claim 19 wherein the one or more predefined actions comprise:
notifying the authorized authority of the wireless device that has usage data that matches the one or more individual usage patterns of the target user to at least the predefined threshold degree; and
if the usage data of the wireless device matches the one or more individual usage patterns of the target user to at least a second predefined threshold degree that is greater than the predefined threshold degree, automatically intercepting at least one of a group consisting of:
communications from the wireless device that has usage data that matches the one or more individual usage patterns of the target user to at least the predefined threshold degree as communications from the target user and communications to the wireless device that has usage data that matches the one or more individual usage patterns of the target user to at least the predefined threshold degree as communications to the target user.

* * * * *